United States Patent Office 2,978,493
Patented Apr. 4, 1961

2,978,493
N-NITROCARBAMATES

Milton B. Frankel, Pasadena, Calif., assignor to Aerojet-General Corporation, Azusa, Calif., a corporation of Ohio No Drawing. Filed June 9, 1955, Ser. No. 514,383

16 Claims. (Cl. 260—482)

This invention relates to new compositions of matter and a method for their preparation. In particular, it relates to N-nitrocarbamates having the general formula:

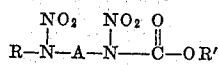

wherein R and R' are alkyl or nitroalkyl radicals and A is an alkylene radical.

The compounds of this invention are prepared by reacting a polynitro carbamate with nitric acid, in accordance with the general reaction scheme set forth below:

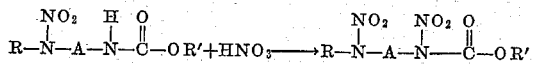

wherein R and R' are alkyl or nitroalkyl radicals and A is an alkylene radical.

The nitration can be effected by nitric acid, fuming nitric acid or by a mixture of sulfuric and nitric acids. It is preferred, however, to use nitric acid in the presence of a dehydrating agent because of the solubility characteristics of the carbamates used as starting materials.

The reaction is preferably conducted at a temperature in the range of from about 0° to about 15° C. The reaction can be performed at higher temperatures; however, it is preferred to run the reaction at reduced temperature to permit better control of the reaction rate. Increased smoothness and control of the nitration is achieved when the reaction is conducted in the presence of a dehydrating agent such as an organic acid anhydride.

The polynitro carbamates used as starting materials in the practice of this invention are prepared by reacting a nitro isocyanate with an alcohol, as disclosed in my copending application Serial No. 514,382, filed concurrently, with this application.

To more clearly illustrate my invention, the following examples are presented. It should be understood, however, that these examples are presented merely as a means of illustration, and are not intended to limit the scope of the invention in any way.

EXAMPLE I

*Preparation of N-nitro-N-(2-nitraza-4,4-dinitropentyl)-2,2,2-trinitroethyl carbamate*

0.5 gm. of N-(2-nitraza-4,4-dinitropentyl)-2,2,2-trinitroethyl carbamate was dissolved in 10 ml. of acetic anhydride. The solution was added dropwise to 10 ml. of 100% nitric acid while maintaining the temperature at 5–10° C. The solution was stirred for 20 minutes and then poured over ice. The resulting white solid was washed with water and recrystallized from ethylene dichloride in 63.5% yield, M.P. 140–141° C. The elemental analysis of the product was as follows:

Calculated for $C_7H_7N_9O_{18}$: percent C, 16.64; percent H, 1.40; percent N, 24.96. Found: percent C, 16.66; percent H, 1.25; percent N, 24.44.
Lead Block Value: 170 T.N.T.=100
Ballistic Mortar Value: 134 T.N.T.=100

EXAMPLE II

*Preparation of N-nitro-N-3-nitrazabutyl-2,2,2-trinitroethyl carbamate*

In a one-liter 3-necked flask, fitted with a mechanical stirrer, thermometer, and dropping funnel, was placed 200 ml. of 100% nitric acid. The acid was cooled to 0–5° C. and a solution of 42.7 gm. (0.13 mole) of 2,2,2-trinitroethyl-2,5-diaza-5-nitro-hexanoate in 200 ml. of acetic anhydride was added dropwise keeping the temperature at 0–5° C. The solution was poured on ice, the white solid collected, washed with water, and dried in vacuo over potassium hydroxide, 42.0 gm. (87.2%). Recrystallization from chloroform gave white needles, M.P. 103–104° C. The elemental analysis of the product was as follows:

Calculated for $C_6H_9N_7O_{12}$: percent C, 19.41; percent H, 2.44; percent N, 26.42. Found: percent C, 19.68; percent H, 2.37; percent N, 25.92.

EXAMPLE III

*Preparation of N-nitro-N-2-nitraza-4,4-dinitropentyl methyl carbamate*

A mixture of 200 ml. of 100% nitric acid and 200 ml. of acetic anhydride was cooled to 5° C., and 24.5 gm. (0.087 mole) of methyl 4,6,6-trinitro-2,4-diaza-heptanoate was added. The solution was stirred for 30 minutes at 5° C. and poured on ice. The white solid was collected, washed with water, and dried; the yield was 27.3 gm. (96.2%) and the M.P. was 104–105° C. Recrystallization from isopropyl alcohol raised the melting point to 105–106° C. The elemental analysis of the product was as follows:

Calculated for $C_6H_{10}N_6O_{10}$: percent C, 22.09; percent H, 3.09; percent N, 25.77. Found: percent C, 22.50; percent H, 3.03; percent N, 25.70.

EXAMPLE IV

*Preparation of N-nitro-N-3-nitrazabutyl methyl carbamate*

A nitrating solution was prepared by the addition of 25 ml. anhydrous nitric acid to 25 ml. acetic anhydride at 0 to 5° C. To this solution 25 gm. (0.191 mole) methyl 3-nitrazabutyl carbamate was added in portions while the temperature was held below 10° C. The solution was stirred for an additional 15 minutes and then poured onto cracked ice. The product crystallized after a few minutes' stirring and was removed by filtration and washed with ice water. The damp crystals were recrystallized from 150 ml. methanol to yield 30 gm. (95.8%) methyl 2,5-dinitrazahexanoate, melting at 54–55° C. A second recrystallization gave material melting at 57–57.5° C. The elemental analysis of the product was as follows:

Calculated for $C_5H_{10}O_6N_4$: percent C, 27.03; percent H, 4.54; percent N, 25.22; percent $OCH_3$, 13.97. Found: percent C, 27.19; percent H, 4.49; percent N, 25.55; percent $OCH_3$, 14.20.

Any member of the N-nitrocarbamate series may be prepared by merely reacting an appropriate nitrocarbamate with nitric acid, in accordance with the teachings of this invention.

The nitro compounds of this invention are useful as high explosives and can be used in any conventional explosive missile, projectile, rocket, or the like, as the main explosive charge. An example of such a missile is disclosed in United States Patent No. 2,470,162, issued May 17, 1949. One way of using the high explosives of this invention in a device such as that disclosed in United States Patent No. 2,470,162, is to pack the crystalline explosive in powder form into the warhead of the missile.

Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propellant charge, and can be caused to explode on operation of an impact- or time fuse-mechanism firing a detonating explosive such as lead azide or mercury fulminate.

I claim:

1. As compositions of matter, N-nitrocarbamates having the general formula:

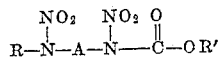

wherein R and R' are radicals selected from the group consisting of lower alkyl and lower nitroalkyl radicals and A is an alkylene radical.

2. As a composition of matter, N-nitro-N-(2-nitraza-4,4-dinitropentyl)-2,2,2-trinitroethyl carbamate having the structural formula:

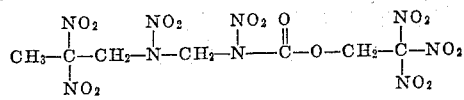

3. As a composition of matter, N-nitro-N-3-nitrazabutyl-2,2,2-trinitroethyl carbamate having the structural formula:

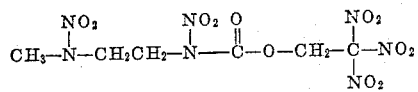

4. As a composition of matter, N-nitro-N-2-nitraza-4,4-dinitropentyl methyl carbamate having the structural formula:

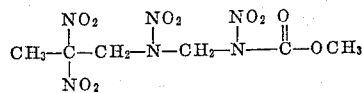

5. As a composition of matter, N-nitro-N-3-nitrazabutyl methyl carbamate having the structural formula:

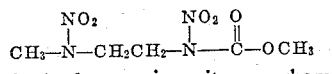

6. The method of preparing nitrazacarbamates having the general formula:

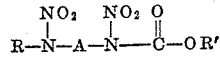

which comprises nitrating a carbamate having the general formula:

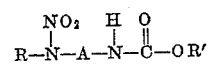

wherein R and R' are radicals selected from the group consisting of lower alkyl and lower nitroalkyl radicals and A is an alkylene radical.

7. The method of claim 6 wherein said nitration is effected in the presence of a dehydrating agent.

8. The method of claim 6 wherein said nitration is effected by a mixture of nitric acid and acetic anhydride.

9. The method of preparing N-nitro-N-(2-nitraza-4,4-dinitropentyl)-2,2,2-trinitroethyl carbamate which comprises reacting N-(2-nitraza-4,4-dinitropentyl)-2,2,2-trinitroethyl carbamate with nitric acid.

10. The method of preparing N-nitro-N-3-nitrazabutyl-2,2,2-trinitroethyl carbamate which comprises reacting N-3-nitrazabutyl-2,2,2-trinitroethyl carbamate with nitric acid.

11. The method of preparing N-nitro-N-2-nitraza-4,4-dinitropentyl methyl carbamate which comprises reacting N-2-nitraza-4,4-dinitropentyl methyl carbamate with nitric acid.

12. The method of preparing N-nitro-N-3-nitrazabutyl methyl carbamate which comprises reacting N-3-nitrazabutyl methyl carbamate with nitric acid.

13. The method of claim 9 wherein said reaction is conducted in the presence of acetic anhydride.

14. The method of claim 10 wherein said reaction is conducted in the presence of acetic anhydride.

15. The method of claim 11 wherein said reaction is conducted in the presence of acetic anhydride.

16. The method of claim 12 wherein said reaction is conducted in the presence of acetic anhydride.

References Cited in the file of this patent

UNITED STATES PATENTS 2,485,855     Blomquist et al. _____ Oct. 25, 1949

OTHER REFERENCES

Curry et al.: Jour. Am. Chem. Soc. 73 (1951), pp. 5043–6.